(12) United States Patent
Pollet et al.

(10) Patent No.: US 8,321,222 B2
(45) Date of Patent: Nov. 27, 2012

(54) SYNTHESIS BY GENERATION AND CONCATENATION OF MULTI-FORM SEGMENTS

(75) Inventors: Vincent Pollet, Aalbeke (BE); Andrew Breen, Norwich (GB)

(73) Assignee: Nuance Communications, Inc., Burlington, MA (US)

( * ) Notice: Subject to any disclaimer, the term of this patent is extended or adjusted under 35 U.S.C. 154(b) by 1180 days.

(21) Appl. No.: 11/838,609

(22) Filed: Aug. 14, 2007

(65) Prior Publication Data
US 2009/0048841 A1    Feb. 19, 2009

(51) Int. Cl.
*G10L 13/08*    (2006.01)

(52) U.S. Cl. ........ 704/260; 704/258; 704/268; 704/269; 704/277; 704/9; 715/264; 379/88.03; 382/187

(58) Field of Classification Search .................. 704/260, 704/256.2, 233, 208, 258, 268, 269, 277, 704/9; 715/264; 379/88.03; 382/187
See application file for complete search history.

(56) References Cited

U.S. PATENT DOCUMENTS

| | | | |
|---|---|---|---|
| 5,153,913 A | 10/1992 | Kandefer et al. | |
| 5,230,037 A * | 7/1993 | Giustiniani et al. | 704/200 |
| 5,384,893 A | 1/1995 | Hutchins | 704/246 |
| 5,479,564 A | 12/1995 | Vogten et al. | 395/2.76 |
| 5,490,234 A | 2/1996 | Narayan | 395/2.69 |
| 5,611,002 A | 3/1997 | Vogten et al. | 395/2.76 |
| 5,630,013 A | 5/1997 | Suzuki et al. | 395/2.25 |
| 5,749,064 A | 5/1998 | Pawate et al. | 704/213 |
| 5,774,854 A | 6/1998 | Sharman | 704/260 |
| 5,845,047 A * | 12/1998 | Fukada et al. | 704/268 |
| 5,873,059 A * | 2/1999 | Iijima et al. | 704/207 |
| 5,899,966 A * | 5/1999 | Matsumoto et al. | 704/205 |
| 5,911,128 A * | 6/1999 | DeJaco | 704/200.1 |
| 5,913,193 A | 6/1999 | Juang et al. | 704/258 |
| 5,920,840 A | 7/1999 | Satyamurti et al. | 704/267 |
| 5,978,764 A | 11/1999 | Lowry et al. | 704/258 |
| 6,144,939 A * | 11/2000 | Pearson et al. | 704/258 |
| 6,161,091 A * | 12/2000 | Akamine et al. | 704/258 |
| 6,246,976 B1* | 6/2001 | Mukaigawa et al. | 704/9 |
| 6,256,609 B1* | 7/2001 | Byrnes et al. | 704/246 |
| 6,308,156 B1* | 10/2001 | Barry et al. | 704/268 |
| 6,463,413 B1* | 10/2002 | Applebaum et al. | 704/256.2 |
| 6,912,495 B2* | 6/2005 | Griffin et al. | 704/208 |
| 7,266,497 B2* | 9/2007 | Conkie et al. | 704/258 |
| 7,596,499 B2* | 9/2009 | Anguera Miro et al. | 704/277 |
| 2003/0097266 A1* | 5/2003 | Acero | 704/260 |
| 2003/0171922 A1* | 9/2003 | Beerends et al. | 704/233 |
| 2005/0119890 A1* | 6/2005 | Hirose | 704/260 |
| 2005/0182630 A1* | 8/2005 | Miro et al. | 704/269 |

(Continued)

OTHER PUBLICATIONS

Black, Alan W, et al, "CHATR: a genetic speech synthesis system", In Proceedings of COLING, 94 Kyoto, Japan.

(Continued)

*Primary Examiner* — Michael Colucci
(74) *Attorney, Agent, or Firm* — Sunstein Kann Murphy & Timers LLP

(57) ABSTRACT

A speech synthesis system and method is described. A speech segment database references speech segments having various different speech representational structures. A speech segment selector selects from the speech segment database a sequence of speech segment candidates corresponding to a target text. A speech segment sequencer generates from the speech segment candidates sequenced speech segments corresponding to the target text. A speech segment synthesizer combines the selected sequenced speech segments to produce a synthesized speech signal output corresponding to the target text.

38 Claims, 9 Drawing Sheets

U.S. PATENT DOCUMENTS

2006/0095264 A1* 5/2006 Wu et al. .................. 704/260
2008/0059190 A1 3/2008 Chu et al. .................. 704/258

OTHER PUBLICATIONS

Campbell, Nick, "Processing a Speech Corpus for Synthesis with Chatr", ICSP '97 (International Conference on Speech Processing), Seoul, Korea Aug. 26, 1997.
Banga, Eduardo R., et al, "Shape-Invariant Pitch-Synchronous Text-to-Speech Conversion", Proceedings of the International Conference on Acoustics, Speech, and Signal Processing (ICASSP), IEEE, 1995, pp. 656-659.
Black, Alan W., et al., "Automatically Clustering Similar Units for Unit Selection in Speech Synthesis", Proceedings of Eurospeech 97, Sep. 1997, pp. 601-604, Rhodes, Greece.
Black, Alan W., et al, "Optimising Selection of Units from Speech Databases for Concatenative Synthesis", European Conference on Speech Communication and Technology, Madrid, Sep. 1995, pp. 581-584.
Campbell, Nick, et al, "Chatr: A Natural Speech Re-Sequencing Synthesis System".
Charpentier, F. J., et al, "Diphone Synthesis Using an Overlap-Add Technique for Speech Waveforms Concatenation", IEEE, 1986, pp. 2015-2018.
Conkie, Alistair D., "Optimal Coupling of Diphones", in J.P.H. van Santen, et al , editors, Progress in Speech Synthesis, Springer verlag, 1997, pp. 293-304.
Ding, Wen, et al, "Optimising Unit Selection with Voice Source and Formats in the Chatr Speech Synthesis System", Proceedings of Eurospeech 97, Sep. 1997, pp. 537-540, Rhodes, Greece.
Dutoit, T., "High Quality Test-to-Speech Synthesis: A Comparison of Four Candidate Algorithms", IEEE, 1994, pp. I-565-I-568.
Edgington, M., "Investigating the Limitations of Concatenative Synthesis", Eurospeech, 1997, pp. 1-4.
Edgington, M., et al, "Overview of Current Text-to-Speech Techniques: Part II—Prosody and Speech Generation", BT Technology Journal, vol. 14, No. 1, Jan. 1996, pp. 84-99.
Hamdy, Khaled N., et al, "Time-Scale Modification of Audio Signals with Combined Harmonic and Wavelet Representations", Proceedings of ICASSP 97, pp. 439-442, Munich, Germany.
Hauptmann, Alexander G., "Speakez: A First Experiment in Concatenation Synthesis from a Large Corpus", Proceedings of Eurospeech93, Sep. 1993, pp. 1701-1705, Berlin, Germany.
Hess, Wolfgang J., "Speech Synthesis—A Solved Problem?", Signal Processing, Elsevier Science Publishers B.V., 1992.
Hirokawa, Tomohisa, et al, "High Quality Speech Synthesis System Based on Waveform Concatenation of Phoneme Segment", IEICE Trans. Fundamentals, vol. E76-A, No. 11, Nov. 1993, pp. 1964-1970.
Huang, X., et al, "Recent Improvements on Microsoft's Trainable Text-to-Speech System—Whistler", Proceedings of ICASSP '97, Apr. 1997, pp. 959-962, Munich, Germany.
Hunt, Andrew J., et al, "Unit Selection in a Concatenative Speech Synthesis System Using a Large Speech Database", IEEE International Conference on Acoustics, Speech and Signal Processing Conference Proceedings, May 1996, vol. 1, pp. 373-376.
Iwahashi, Naoto, et al, "Concatenative Speech Synthesis by Minimum Distortion Criteria", IEEE, 1992, pp. II-65-II-68.
Iwahashi, Naoto, et al, "Speech Segment Network Approach for Optimization of Synthesis Unit Set", Computer Speech and Language, 1995, pp. 335-352.
King, Simon, et al, "Speech Synthesis Using Non-Uniform Units in the Verbmobil Project", Proceedings of Eurospeech '97, Europress, 97, Sep. 1997, pp. 569-572, Rhodes, Greece.
Klatt, Dennis H., "Review of Text-to Speech Conversion for English", Journal of Acoustic Society of America, 82 (3) Sep. 1987, pp. 737-793.
Lee, Sungjoo, et al, "Variable Time-Scale Modification of Speech Using Transient Information", Proceedings of ICASSP '97, Apr. 1997, pp. 1319-1322, Munich, Germany.
Lin, Gang-Janp, et al, "High Quality of Low Complexity Pitch Modification of Acoustic Signals", IEEE, 1995, pp. 2987-2990.
Kraft, Volker, "Does the Resulting Speech Quality Improvement Make a Sophisticated Concatenation of Time-Domain Synthesis Units Worthwhile?", Proc. 2.sup.nd ESCA/IEEE Workshop on Speech Synthesis, 1994, pp. 65-68.
Laroche, Jean, et al, "HNS: Speech Modification Based on a Harmonic+Noise Model",IEEE, 1993, pp. II-550-II-553.
Moulines, E., et al, "A Real-Time French Text-to-Speech System Generating High-Quality Synthetic Speech", International Conference on Acoustics, Speech & Signal Processing, ICASSP, IEEE, 1990, vol. 15, pp. 309-312.
Nakajima, Shin'ya, "Automatic Synthesis Unit Generation for English Speech Synthesis Based on Multi-Layered Context Oriented Clustering", Speech Communication, vol. 14, 1994, pp. 313-324.
Portele, Thomas, et al, "A Mixed Inventory Structure for German Concatenative Synthesis", Progress in Speech Synthesis, J.P.H. van Santen, et al, editors, Springer verlag, 1997, pp. 263-277.
Quartieri, T.F., et al, "Time-Scale Modification of Complex Acoustic Signals", IEEE, 1993, pp. I-213-I-216.
Rudnicky, Alexander, I ., et al, "Survey of Current Speech Technology", Communication of the ACM, vol. 37, No. 3, Mar. 1994, pp. 52-57.
Sagisaka, Yoshinori, "Speech Synthesis by Rule Using an Optimal Selection of Non-Uniform Synthesis Units", IEEE, 1998, pp. 679-682.
Saito, Takashi, et al, "High-Quality Speech Synthesis Using Context-Dependent Syllabic Units", Proceedings of ICASSP '96, May 1996, pp. 381-384, Atlanta, Georgia.
Verhelst, Werner, et al, "An Overlap-Add Technique Based on Waveform Similarity (WSOLA) for High Quality Time-Scale Modificaiton of Speech", IEEE, 1993, pp. II-554-II-557.
Yim, S., et al, "Computationally Efficient Algorithm for Time Scale Modification GLS-TSM", Proceedings of ICASSP '96, May 1996, pp. 1009-1012, Atlanta, Georgia.
Coorman, G., et al, "*Segment Selection in the L&H Realspeak Laboratory TTS System*", 20001016, Oct. 16, 2002, XP007010695.
Donovan, R.E., et al, "*Current Status of the IMB Trainable Speech Synthesis System*", Proceedings of ISCA Tutorial and Research Workshop on Speechsynthesis, Jan. 1, 2001, pp. 1-4, XP002408993.
Stober, Karlheinz, et al, "Synthesis by Word Concatenation", Verbmobil: Foundations of Speech-to-Speech Translation, vol. 2, 2000, pp. 619-622, XP997001054, Berlin.
Tokuda, Keiichi, et al, "An Hmm-Based speech Synthesis System Applied to English", Speech Synthesis, 2002, Proceedings of 2002 IEEE workshop on Sep. 11-13, 2002, Piscataway, NJ, USA, IEEEE, pp. 227-230; XPO10653652, ISBN: 978-0-7803-7395-2.
European Patent Office, PCT International Search Report, dated Nov. 14, 2008; Application No. PCT/US2008/072870.

* cited by examiner

SYNTHESIS BY GENERATION AND CONCATENATION OF MULTI-FORM SEGMENTS

FIELD OF THE INVENTION

The present invention relates to speech synthesis.

BACKGROUND ART

Machine generated speech can be produced in many different ways and for many different applications, but there are two basic methods for synthesizing speech signals currently in wide-spread use. One method attempts to construct speech signals using a model, while the other method concatenates pre-stored speech segments. Model-based approaches tend to be efficient in storage and flexibility, but produce rather synthetic sounding speech. An example of model-based speech synthesis is Hidden-Markov-Model (HMM) based speech synthesis described, for example, in T. Yoshimura, K. Tokuda, T. Masuko, T. Kobayashi, and T. Kitamura, "*Simultaneous Modeling of Spectrum, Pitch And Duration In HMM-Based Speech Synthesis*," in Proc. of Eurospeech, 1999, pp. 2347-2350, incorporated herein by reference.

The other method of speech synthesis, segment-concatenation, can produce very natural speech at its best, but is rather inflexible and requires large amounts of storage. A large corpus of speech data needs to be recorded and accurately labeled for use in a commercially viable text-to-speech system. An example of a segment-concatenation based approach is the Realspeak TTS system described, for example, in G. Coorman, J. Fackrell, P. Rutten & B. Van Coile, "*Segment Selection In The L&H Realspeak Laboratory TTS System*", Proceedings of ICSLP 2000, pp. 395-398, incorporated herein by reference.

Table 1 establishes a typology of both TTS methods according to various characteristics:

As seen in Table 1, one significant difference between these two approaches is that model-based methods can construct previously unseen sounds (e.g., for a given prosodic context), where as segment-based systems are constrained by their segment coverage. The dynamic construction of "unseen" sounds by falling back on other sub-segment model properties is a feature that enables generalization.

SUMMARY OF THE INVENTION

Embodiments of the present invention are directed to a speech synthesis system and method. A speech segment database references speech segments having various different speech representational structures. A speech segment selector selects from the speech segment database a sequence of speech segment candidates corresponding to a target text. A speech segment sequencer generates from the speech segment candidates a sequenced speech segments corresponding to the target text. A speech segment synthesizer combines the sequenced speech segments to produce a synthesized speech signal output corresponding to the target text.

In further specific embodiments, the different speech representational structures may include model-based speech signals, template-based speech signals, and model-based speech signals augmented with template information. The model-based speech representational structures may be based on a statistical speech model, and the speech segment selector may use a statistical speech model for selecting the speech segment candidates. The speech segment selector may use template information to augment the statistical model. The different speech representational structures may share at least one parameter component, and the shared parameter component may be encoded differently in different speech representational structures.

In various specific embodiments, static observations and/or observations from the speech segment selector may be used in generating the sequenced speech segments. Statistically derived cost-functions, empirical rules, and/or psycho-acoustic rules may be used for selecting the speech segment candidates and/or generating the sequenced speech segments.

| Category | Segment concatenation | Model-based |
|---|---|---|
| Speech quality | Uneven quality, highly natural at best. Typically offers good segmental quality, but may suffer from poor prosody. | Consistent speech quality, but with a synthetic "processed" characteristic. |
| Corpus-size | Quality is critically dependent upon the size of the sound inventory | Works well on a small corpus |
| Signal manipulation | Minimal to none | Signal manipulation by default |
| Basic Unit topology | Waveforms | Speech parameters |
| System footprint | Simple coding of the speech inventory leads to a large system footprint | Heavy modelling of the speech signal results in a small system footprint. Systems are resilient to reduction in system footprint. |
| Generation quality | Quality is variable depending upon the length of continuous speech selected from the unit inventory. For example, limit domain systems, which tend to return long stretches of stored speech during selection, typically produce very natural synthesis. | Smooth and stable, more predictable behaviour with respect to previously unseen contexts. |
| Corpus-quality | Need accurately labelled data | Tolerant towards labelling mistakes |

DETAILED DESCRIPTION OF SPECIFIC EMBODIMENTS

Figure 1:
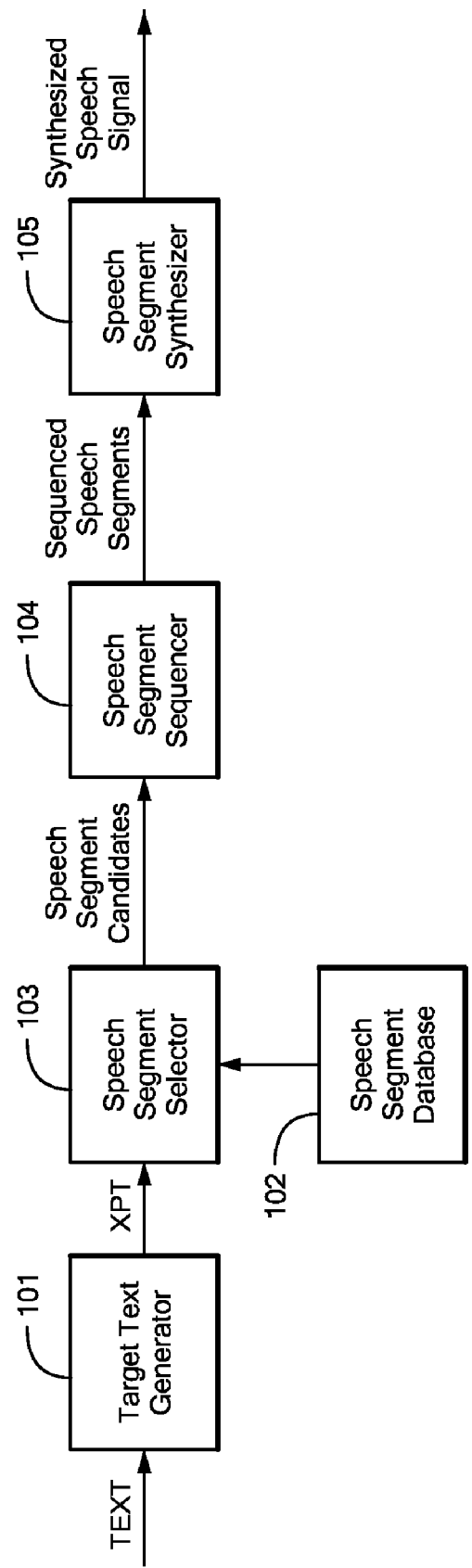
FIG. 1 shows an overview of a hybrid speech synthesis system according to embodiments of the present invention.

In the following description, the specific example of speech signals is used, invention is not restricted to speech signals and can be generalized to other domains of information processing and generation. Other specific embodiments can be based on other signals that can be modeled (e.g., non-stochastic signals) or to a sequence of patterns, including without limitation: volatility estimation of stocks, hydrological and environment time series, phoneme sequences, character sequences, sequences of parts of text, DNA sequences, etc.

In embodiments of the present invention, synthetic speech signals are generated by optimally sequencing and combining "hybrid segments." Hybrid segments are different speech signal representations, for example, synthesis models, templates, and synthesis models augmented with template information. A speech synthesis model is distinguished from a speech synthesis template in that a speech synthesis model is an abstract representation of multiple template examples, the properties of which may be altered—e.g., to construct a new sound—without degrading the naturalness of the sound. Generally, a hybrid segment is a contiguous block of data which can range from a sequence of speech samples (a frame) to any number of contiguous or adjacent frames (or states) building up and aligning with linguistically motivated basic speech-units such as half-phones, diphones, phonemes, syllables, phrases, etc.

In a hybrid segment system, sequencing of the speech segments may be based on various specific algorithms such as cost functions derived from statistics, empirical rules, and/or psycho-acoustical rules. Speech segment combination is not restricted to any one specific approach, and may be based, for example, on time, frequency, or parametric domains, or a combination of different domains.

In some specific embodiments, supplementary speech synthesis signals may be available, for example, domain—or application-specific speech signal fragments may be available. This may be useful for seamlessly combining more general synthesis fragments with an application prompt like "Welcome to Nuance Communications directory service," or common words or phrases like "Goodbye," or "Stocks fell on Wall Street today." Specific speech synthesis fragments may possess a specific speaking style which is different from a more general style, or which is a more extreme example of the general style. Different synthesis segment fragments may be stored using different coding schemes (e.g., less aggressive compression) than other hybrid fragments. A synthesis segment fragment also may contain additional information, not available to general hybrid fragments.

In specific embodiments, a template synthesis segment may be an instance of a natural speech segment that is coded or represented in some specific form, and which may be classified by its symbolic, prosodic, and stylistic context. The size of a specific speech segment may vary from a single frame up to any number of contiguous or adjacent frames (or states) that can be built up and aligned with linguistically motivated basic speech units such as half-phones, diphones, phonemes, syllables, phrases, etc. One specific example of a template synthesis segment is a speech signal waveform represented in PCM form as is obtained by recording a specific word such as the function word "at."

A model synthesis segment may be a synthesis segment that approximates a natural speech segment instance by abstraction of general and/or specific signal properties and which is classified by its symbolic, prosodic and stylistic context. A synthesis model segment can be coded or represented in any convenient particular form. An example of a model synthesis segment is a statistical state model of a specific word such as the function word "at" that is obtained by an HMM-training process on a large speech corpus containing multiple and different instances of the function word "at."

A hybrid synthesis approach can combine the two approaches of statistical modeling and segment concatenation to benefit from each technique so that hybrid segment synthesis candidates are obtained by optimally selecting and generating fragments of different speech signal representational structures.

FIG. 1 shows an overview of a hybrid speech synthesis system according to embodiments of the present invention. A target text for synthesis is produced by target text generator 101. In the example shown in FIG. 1, the input text is a simple phonetic transcription which is converted by the target text generator 101 into a multi-layer internal data sequence target text to be synthesized, Extended Phonetic Transcription (XPT), which typically may include linguistic feature vectors such as phonetic descriptors, symbolic descriptors, and prosodic descriptors. In some specific embodiments, the target input text may be provided to the system directly such that a target text generator 101 may not be required. Speech segment database 102 references speech segments having various different speech representational structures. Speech segment selector 103 selects from the speech segment database 103 a sequence of speech segment candidates corresponding to the target text, for example, using a statistical model such as a hidden Markov model (HMM). Speech segment sequencer 104 generates from the speech segment candidates sequenced speech segments corresponding to the target text. Speech segment synthesizer 105 combines the sequenced speech segments to produce a synthesized speech signal output corresponding to the target text.

For model-based speech-signal representations, the sequencing and generation process may specifically follow an optimization process using a statistical model optionally augmented with template observations. Model-based speech signal representations may be obtained from a statistical training process using template speech segments from the same speaker, another speaker, or a set of different speakers. Template-based speech signal representations may be any representation form or coding method e.g. PCM, CELP, HNM, Residual Excited LPC, VQ'ed MFCC's, etc. Template and model representations of a speech signal may share a number of parameter components, which may or may not be differently coded. All speech signal representations may be modified within a hybrid approach. For example, the use of prosody modification techniques such as LPC, TD-PSOLA, HNM, etc.

Figure 2:
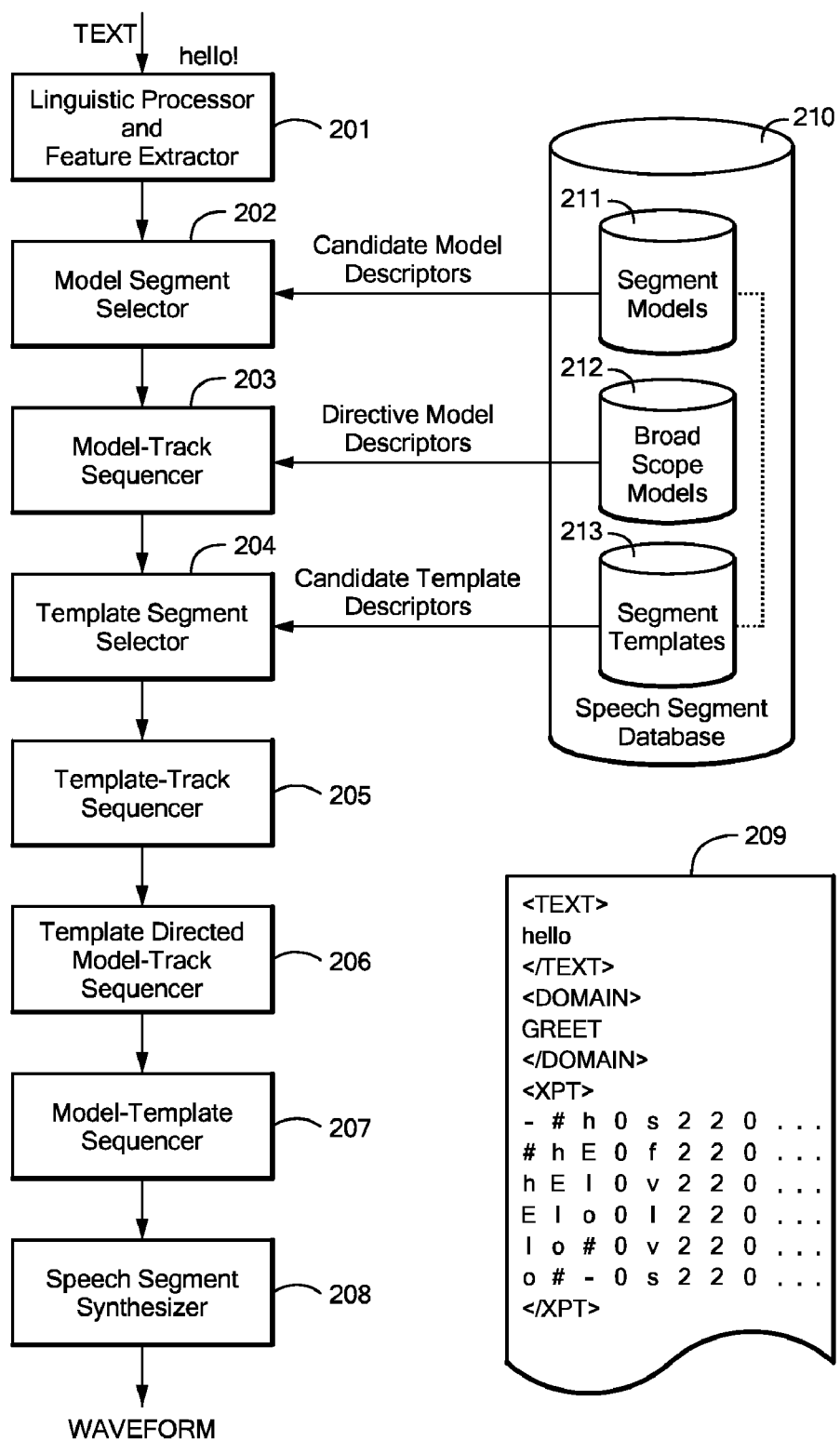
FIG. 2 shows an example of one specific embodiment of a hybrid speech synthesis system.

FIG. 2 depicts an example of one specific embodiment of a hybrid text-to-speech synthesis system. Linguistic processor 201 receives a text input, e.g., the phrase "Hello!" which is converted from graphemes to phonemes to produce a target text in the specific form of a phonetic data sequence. For generic text, the target text produced by the linguistic processor 201 may reflect linguistic, para-linguistic, and phonetic information determined from an analysis of the input text. Some input text may contain information relevant to the selection of supplementary fragments, in which case the target text produced by the linguistic processor 201 may include fragment indexing information.

In FIG. 2, the input text is converted by a target sequencer 209 within the linguistic processor 201 into a target text in the specific form of a multi-layer internal data sequence to be synthesized. In this case, a simple phonetic transcription—#'hE-lO#—is generated in a form known as Extended Phonetic Transcription (XPT), which mainly contains linguistic feature vectors (including phonetic descriptors, symbolic descriptors, and prosodic descriptors). While XPT is used in the description of FIG. 2, in other alternative embodiments, the phonetic data sequence of the target text may be in other specific forms.

Model segment selector 202 retrieves from segment model database 211 descriptors of candidate speech segment models that can be sequenced and synthesized into the target utterance. The model segment selector 202 searches the segment model database 211 by comparing the XPTs of the candidate speech segment models with the target XPT. Candidate-to-target matching is based on symbolic feature vectors, such as phonetic context and prosodic context, and numeric descriptors, and determines how well each candidate model fits the target specification. Segment model database 211 can include one or more prosodic and voice models. Examples of different prosodic models include models for generating questions, statements and spelling. Multiple models may exist for a particular sub-category e.g. "question intonations" which differ stylistically. Multiple voice models in combination with multiple prosodic models may be used for different stylistic and emotional domains.

Model track sequencer 203 produces optimal and smooth model-parameter tracks from the sequence of candidate speech segment models produced by the model segment selector 202. Smooth parameter tracks are preferred because simply sequencing the speech segment models to determine the model-parameter tracks may produce unnatural varying tracks (e.g. choppy and discrete-step tracks). That is because individual speech models have no broader scope or knowledge of how parameter tracks evolve over longer time stretches and are not explicitly restricted to a specific position within a model-sequence. A sequence of candidate speech segment models can be found for any target speech fragment by model segment selector 202 due to its generalization characteristic.

Model-track sequencer 203 uses directive model descriptors fetched from broad scope models database 212 to produce smooth and natural varying model parameter tracks from the sequence of candidate segment models. One specific example of a directive model descriptor is the variance of the spectrum of unvoiced and voiced regions within the target utterance.

Template segment selector 204 retrieves from segment template database 213 descriptors of candidate segment templates specified by the XPT transcription (or fragment indices if supplementary fragments are requested), as symbolic targets and the model parameter tracks as acoustic targets. The parameter tracks may be determined for the length of the utterance, so the derived acoustic targets may be considered global to the utterance. The Template Segment Selector 204 creates an ordered list of candidate template segments by comparing the XPTs of the candidate segment templates with the target XPT and target acoustic tracks, assigning a target cost to each candidate. Candidate-to-target matching is based on symbolic feature vectors, such as orthographic context, phonetic context, prosodic context and numeric descriptors, and acoustic feature vectors, such as pitch, energy, spectral envelope, duration etc. and determines how well each segment template candidate fits the target specification. Poorly matching candidates may be excluded at this point possibly resulting into an empty or sparse template candidate list. In the event of supplementary fragments being requested, a direct match is assumed for that fragment based on information contain within the fragment indexing.

Template track sequencer 205 determines which candidate segment templates can be concatenated without causing disturbing quality degradations such as clicks, pitch discontinuities, etc. Successive candidate segment templates are evaluated by the template track sequencer 205 according to a quality degradation cost function. Candidate-to-candidate matching uses acoustic information such as energy, pitch, and spectral information to determine how well the candidates can be joined together. Using dynamic programming, the best sequences of candidate speech units are selected for output to template directed model-track sequencer 206. The template candidate lists can sometimes be sparse, so the dynamic programming can output a number of non-adjacent partial sequences of templates.

Template directed model-track sequencer 206 regenerates the model-parameter tracks using observations from the template sequences resulting from template track sequencer 205 and model track sequencer 203 using broad scope models as directive descriptors to generate smooth and natural model-parameter tracks from the sequence of model segments. Template directed model-track sequencer 206 further refines the model-parameter tracks to match the parameter observations of the template sequences. From the template track sequencer 205 result, template directed model-track sequencer 206 can compute local target directive descriptors directly from the template sequences for the current utterance. When the template track sequencer 205 produces short template sequence results, then the local target directive descriptors will only have a small influence in generating the model-parameter tracks.

Model-template sequencer 207 determines the final model-template speech segment sequence. A first sequence of model and templates was determined by the template segment selector 204 which uses symbolic and acoustic targets scores, hierarchical context matching scores, and acoustically motivated rules to generate template candidate lists. Because the template candidate lists may be sparse, a set of template partial-sequences (or template partial-paths) may be computed by template track sequencer 205. In the case of sparse template candidate lists, (template-augmented) model segments may be used as filler segments. When none of the template candidate lists are empty, then the full template sequence paths are computed. Results of template track sequencer 206 include template sub-path scores. Model template sequencer 207 uses these scores in combination with linguistic, acoustic, and directive rules to determine the final model-template sequence. These rules can either be empirical (for more simple rules) or based on a statistical/acoustical model (more complex rules are trained from observations).

Speech segment synthesizer 208 receives the speech segments either as templates from the segment template database 213 or as model parameter tracks. The template segments can be represented either as parameters or as waveforms. The parameters are interpolated and generated when the waveforms are concatenated using an overlap-add technique. Finally, speech segment synthesizer 208 generates the speech segments forming the output speech that represents the target input text.

In the hybrid segment system illustrated in FIG. 2, the operation mode is related to the size of segment template database 213. When template segment database 213 is empty or non-existent, the system will be similar to a statistical parametric or HMM-based TTS system which will sequence only model segments and generate the output speech by synthesizing the parameter tracks derived from the model sequence. On the other hand, when template segment database 213 is very large, the system converges to a unit-selection based TTS system where the output speech is generated by concatenating template speech segments. Correspondingly, when template segment database is relatively small, the system will optimally merge model segments with template segments but typically using more model than template sequences to generate the output speech. And when template segment database 213 is larger, the system will optimally merge model segments with template segments but typically use more template sequences than model sequences to generate the output speech. Thus, the system optimizes the usage of good template candidate segments for different sizes of template segment database 213 while being able to compensate for "unseen" candidates by the usage and sequencing of augmented segment models.

The quality of domain-specific unrestricted input text-to-speech can be further increased by combining canned (pre-constructed) speech synthesis with hybrid speech synthesis in carrier-slot synthesis. Carrier-slot speech synthesis combines canned carrier phrases with open slots to be filled out by means of hybrid synthesis. The hybrid synthesis can take into account the properties of the boundaries of the carriers to select the best segment sequences.

Figure 3:
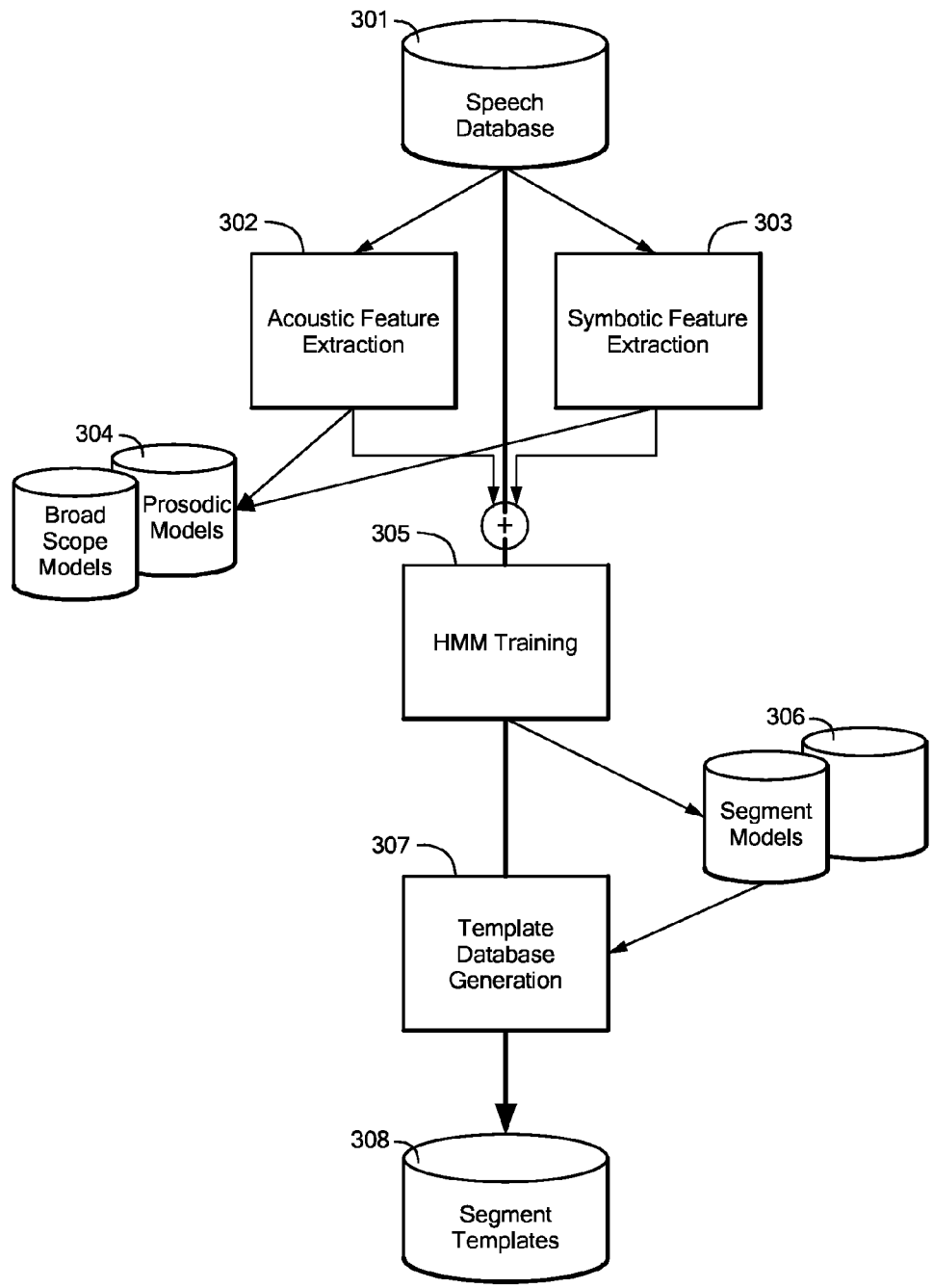
FIG. 3 illustrates the training process as used in one specific embodiment.

FIG. 3 shows an overview of the basic training processes and dataflow. Basic information necessary for training is stored in speech databases 301 and includes, for example:
  Sampled speech
  An orthographic transcription of the speech, which may include prosodic and para-linguistic markup or annotation
  A phonetic transcription of the speech with or without segmental time-alignments.
Speech databases 301 may be divided into those which contain supplementary information and those which to be used for constructing prosodic models and context dependent models for general synthesis.

Acoustic feature extraction 302 and symbolic feature extraction 303 operate on the speech databases 301 and generate parametric features. Acoustic features derived from the acoustic signal may include:
  Spectrum information represented in a specific form such as MEL-LSP's, MFCC's, MEL-CEPs, harmonic components, etc.
  Excitation information represented in a specific form such as fundamental frequency (F0), mixed excitation parameters, voicing information, etc.
  Energy information represented in specific form such as log-RMS, etc.
  Time information: Pitch marks, utterance duration, etc.
Symbolic features derived from an analysis of the orthographic and phonetic transcription may include:
  Phrase, word, and syllable boundaries
  Stress and tone information.
  Part-of-speech information.
  Phoneme property information such as phone class, position (in syllable, word, phrase, sentence), counts, etc.
  Syllable property information such as position (in word, phrase and sentence), counts, etc.
  Word property information such as position (in phrase, sentence), counts, etc.
  Phrase property information such as position (in sentence, paragraph), counts, etc.
  Sentence and paragraph information.
  Prosodic annotation.
  Tag information (e.g. domain or stylistic tags)
  Context information (e.g., left, current, and right phoneme symbols)

As a result of the acoustic feature extraction 303, the speech utterances, previously represented as speech waveforms are now also represented in a parametric form. The precise nature of this parametric data will depend upon the type of acoustic and symbolic feature extraction performed. Prosodic and broad scope models 304 based on the speech data may also be constructed. Different stylistic domains may be stored within one prosodic model or as different prosodic models. Segment models 306 are then produced using standard HMM training methods 305 from data obtained through the feature extraction phase. The topology of these models may differ and depend upon whether they are used to store generalized statistical information or information relating to specific speech fragments. Different stylistic domains may be stored within one segment model or as different segment models 306.

A segment template database 308 is constructed by applying a forced alignment technique using both the segment models and the speech utterances. Information that is compiled into the segment template database 308 may include, for example:
  Template segment onset, offset and duration times.
  XPT vector corresponding with the segment template.
  Acoustic feature cluster-id vector corresponding with the segment template and applied model segment.
  Performance scores and confidence measures of the template segment.
  Index and position of the template segment in the speech utterance.
  Waveform and acoustic parameters of the speech utterances in any representation form or coding method.
  Orthographic information Within this general process each stage may employ one or more different methods. Feature extraction methods are known to those familiar with the art of speech processing. The training method may be based on a set of context dependent phone models (e.g., triphones) which are constructed from the phoneme and symbolic feature sets. Clustering can be used to provide robust statistical triphone models. In a hybrid approach, a model may contain probability density function (PDF) information derived from training on a number of example phrases or information about a specific phrase. The topology of the models may be the same for all contexts or it may vary depending upon whether the model is being used to represent a generalized spectrum or a specific example. In some situations, a model could represent a word or even a phrase.

Figure 4:
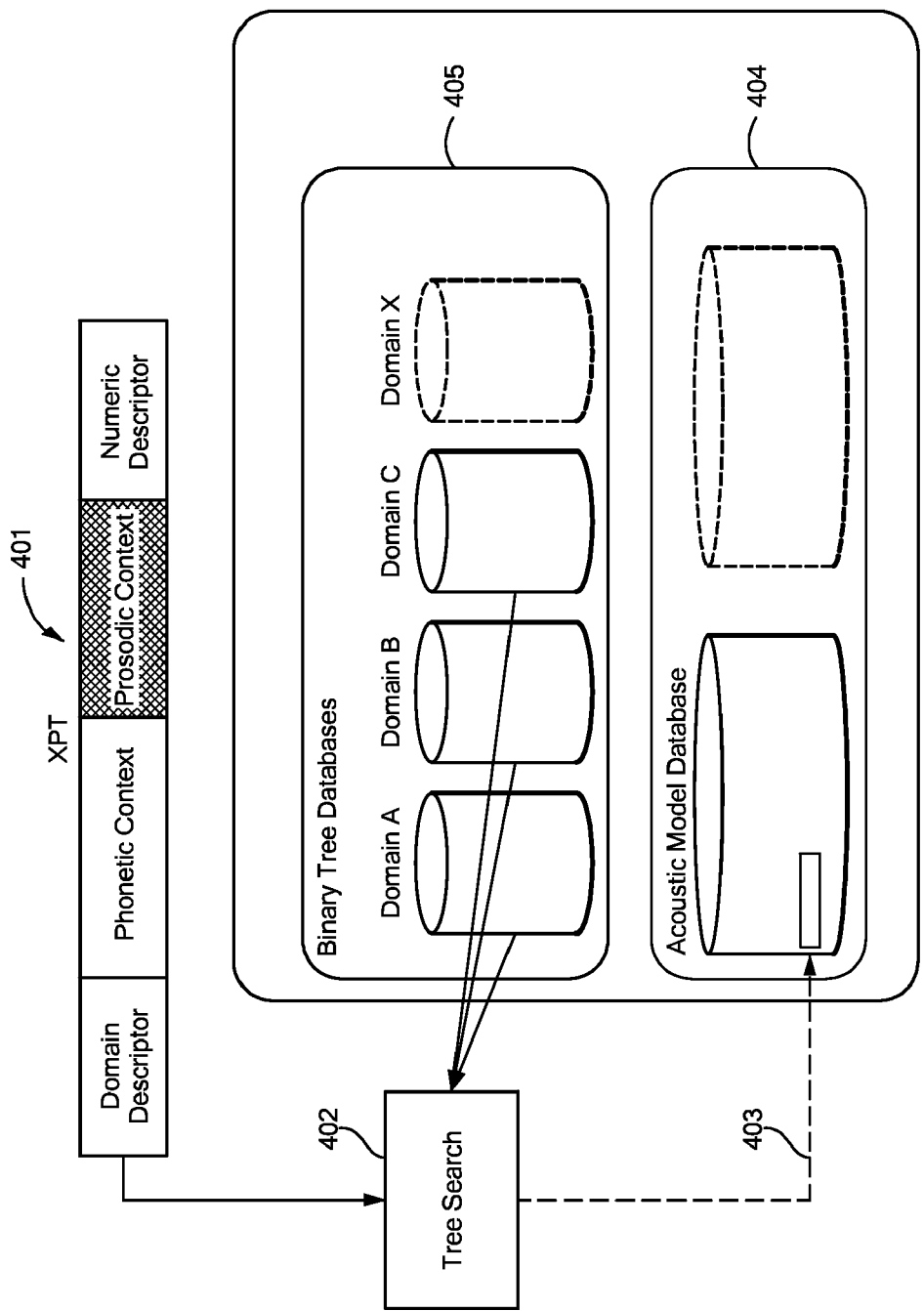
FIG. 4 illustrates the model selection process of a specific embodiment.

FIG. 4 depicts the model segment selection process and data used in the hybrid generation and selection. Model selection is performed by searching the segment model database and comparing the XPTs of the candidate speech segment models 403 with the target XPT 401. The target XPT 401 may include a domain identifier, phonetic context, prosodic context, and numeric descriptors. Typically, a tree search 402 is performed by questioning the target XPT 401 using a binary tree database 405. Leaf nodes of the binaries trees are indexes to corresponding acoustical models 404. The acoustical models 404 are built from the acoustic features described above. The binaries tree database 405 may be obtained as a result of the HMM model training process described above. Speech segment models can be implemented in different formalisms such as:

Full HMM models (State Probability Density Functions and State Transition probabilities)

Probabilities Density Functions of the individual HMM state parameters

Clustered averaged-mean segments

The model track generation process seeks to create smooth and natural varying parameter tracks from the selected model-segment sequence. A parameter track generation algorithm using segment models is described in Tokuda, K., Kobayashi, T., and Imai, S. "*Speech Parameter Generation From HMM Using Dynamic Features*," in ICASSP (1995), incorporated herein by reference. A further enhancement of the speech parameter generation algorithm is described in T. Toda and K. Tokuda. "*Speech Parameter Generation Algorithm Considering Global Variance For HMM-Based Speech Synthesis*," in Proc. of Interspeech (Eurospeech), 2005, incorporated herein by reference, in which an additional model is used that represents the global variance of speech parameters within the training utterances. For example, in one specific embodiment, initial global variance models for different broad-phoneme classes may be constructed during the training phase, which are referred to as broad scope models. These global variance models are observations on how specific acoustic parameters evolve and vary over longer time stretches. Typical HMM models are triphones and restricted to their context definition without broader knowledge. The averaging effect of the statistical training process reduces the natural variance of the parameters and can cause over-smoothing. Examples of broad-phoneme classes include: voiced speech, unvoiced speech, silences, consonants, fricatives, and also initial voiced speech, medium voiced speech, final unvoiced speech classifications, etc.

During parameter track generation from the model sequence, the initial global variance models may be consulted and applied based on the XPT string used as search key. Subsequently, the track generation algorithm may optimize track naturalness by taking into account information on how a parameter track varies over a longer time stretch within a given broad-scope context. By deriving and applying different broad scope models based on broad-phoneme classes, the accuracy and naturalness of parameters tracks is much better compared to using an utterance-wide variance model.

The symbol $\tau$ can be used for a template candidate, and the symbol $\mu$ used for a model candidate. The best template sequence $K_\tau = [\tau_i \ldots \tau_T]^T$ is defined as the path of templates from the template database that minimizes following Equation (1):

$$\sum_{i=1}^{n} (D_c(\tau_i, \tau_{i-1}) * w_c + D_t(\tau_i, t_i) * w_t) \quad (1)$$

where n is the number of templates in the utterance. $D_c(\tau_i, \tau_{i-1})$ is a continuity distortion measure and is defined as the distortion between two successive template segments. $D_t(\tau_i, t_i)$ is a template distortion measure and defined as the distance between a target template t and a selected template $\tau_i$. Both continuity distortion and template segment distortion measures are multiplied with a weight vector w that either puts more weight on the continuity or target distortion.

Figure 5:
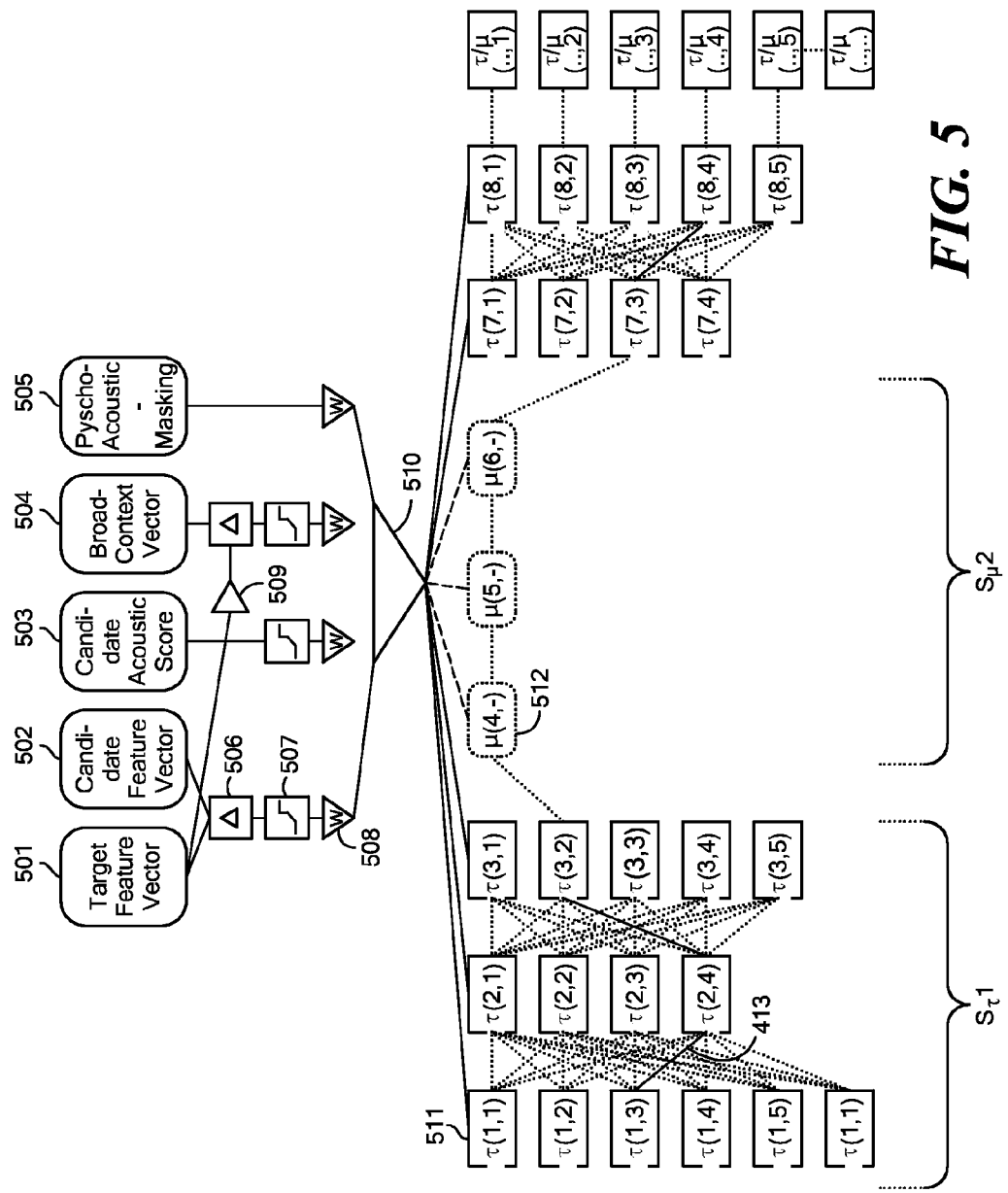
FIG. 5 illustrates template selection and track generation in a specific embodiment.

FIG. 5 depicts the working principle of the template selection and track generation process. A distance vector is computed between target feature vector 501 (containing symbolic and acoustic target information as result of the model track generation process) and candidate feature vectors 502. The symbolic-acoustic search to obtain the candidate feature vectors 502 can be embedded in a tree search in which the leaf nodes represent the acoustics of the templates. The distance vector can be computed based on a specific distance function which can depend upon the components of the feature vectors. Different distance functions 506 such as Euclidean, Mahanalobis, Kullback-Leibler, etc. distances can be used.

The distance vector is then re-shaped by a dynamic masking function 507. Dynamic masking functions (as defined in G. Coorman, J. Fackrell, P. Rutten & B. Van Coile, "*Segment Selection In The L&H Realspeak Laboratory TTS System*," in Proceedings of ICSLP 2000, pp. 395-398, incorporated herein by reference) can be useful during template selection and track generation to facilitate rejection of bad segment combinations and thereby reduce concatenation artefacts. In hybrid segment synthesis systems, some masking functions can be dynamically shaped by model segment observations which are used as target descriptors. Piece-wise constant parts (or flat parts) of the masking functions can be updated by the statistical descriptors of the model segments. For example, the variance descriptor of a target model segment multiplied by a control factor may determine a transparency threshold or flat part of the masking function. The usage of transparency masks introduces less differentiation between candidate segments that are "equally good." The masking functions are consequently also dynamically constructed and shaped during the selection process.

In addition to the symbolic and acoustic targets, other features may be used in some specific embodiments to compute template candidate distances such as candidate acoustic scores 503 which are template performance scores in the form of a log-likelihood ratio of the current context versus an anti-phone context, which is a side result of the forced-alignment process. Broad-context scores 504 are also used by comparing the broader symbolic context of the target with the broader context using a cumulative delay of the XPT strings 509 of the candidate templates.

Psycho-acoustic masking 505 can also be used during segment selection. Psycho-acoustic masking 505 refers to perceptual masking based on linguistic-motivated events. Multiple listening experiments using hybrid segment synthesis have indicated that specific linguistic events correlate with human speech perception. It has been found that not all speech segments need fine grain detail and resolution (in terms of spectrum, pitch, energy and excitation) in order to generate high-quality or transparent speech. In other words, well-selected and sequenced model segments can be joined with template segments without a perceptually salient difference. For example, in a syllable all template sequence specific consonants (with respect to phone-class and duration) at syllable edges can be substituted with model segments without causing noticeable speech degradation. In some embodiments, psycho-acoustic masking 505 may be used to back-off on context and target constraints during template candidate selection. That is, at specific locations identified by linguistic motivated events, where it has been found that low-detail speech segments are not perceptually salient compared to high-detail segments, template context costs and target costs can be relaxed. In an alternative embodiment, psycho-acoustic masking 505 can be used to prune the template database (off-line or on-line) so that more model segments will be selected at locations which are invariant to speech perception. Psycho-acoustic masking 505 can be implemented, for example, in fuzzy tables with or without combination of other standard masking functions. Psycho-acoustic masking 505 depends upon the generation or synthesis quality of the model segments. If significant abstraction is used for the model segments (e.g. a simple speech production model) then fewer model segments can be used for the template/model sequence to attain a given speech quality level.

All the distances of the template candidates are re-shaped by masking functions 507, weighted 508 and summed 510. The summed distances are the template candidate costs. The template candidate list can be pruned by applying different pruning techniques. Sometimes, a template candidate list can be empty as result of:

Hard pruned template candidate lists.

Sparse template candidate database; no suitable candidates In that case, the Viterbi path-search that minimizes Equation (1) above computes M partial-paths, $S_\tau$ 511 of non-empty candidate-lists. The best template sequence 512 becomes a sequence of partial paths $K_\tau = [S_{\tau,i} \ldots S_{\tau,M}]^M$ where $T_M$ is defined as the total template length of the M partial paths and $$\eta = \frac{T_M}{T}$$

is defined as the partial path ratio, which is the ratio of the total template length of the M partial paths over the total length of the model segments.

When the variance control factor of the dynamic masking functions 507 is enabled, then multiple alternative parallel partial paths may compete against each other and are considered to be "equally good". When this occurs, then these alternative parallel paths (single or partial) are kept as options. During the model-template sequencing process the final template path decision can be made.

One common problem with HMM-based TTS systems is over-smoothing of the parameters tracks due to the statistical processing during training. Over-smoothing can be alleviated by a number of methods such as post-filtering or a well designed training set and the use of multiple Gaussian mixtures as a model topology during training. In specific embodiments, a novel method for compensating the over-smoothing effect is introduced as template directed model track generation. Template directed model track generation further enhances the parameter tracks computed from the model segments so that, in addition to compensating for over-smoothing, the acoustic and perceptual differences between the model segment sequence $S_\mu$ and the template segment sequence $S_\tau$ are minimized at synthesis time. The observations of the template partial paths $K_\tau$ are used to enhance the parameter tracks (computed from the model segments). The parameter tracks are re-generated using broad-phoneme class-based static template local variance vectors determined from the partial template paths as directive descriptors to the model segment sequence $S_\mu$. The XPT-string is used as match-key to determine whether to update the static template local variance during the generation process of the parameter tracks.

Template augmentation refers to enriching model segments with natural observations from the selected templates. Model segments are simplified approximations of speech fragments, so overruling some important approximation parameters by observations taken from real speech fragments results into better model candidates. The explicit durations from the template segments $S_\tau$ are imposed to the model segments $S_\mu$. And static local variance vectors derived from the template segments for spectrum and/or excitation are implied on the model segments during the track generation. Template feature observations of spectrum and excitation are also used for augmenting segment models to candidate boundary models.

The candidate boundary segment models $S_{b\mu}$ are segment models $S_\mu$ augmented with template information from the template partial paths. This template augmentation is performed before generating the parameter tracks at the boundary locations of the template paths or at the boundaries of (long) contiguous template chunks. The corresponding models are augmented with template information. This template information is available for computing the joins of the template segments τ. Augmenting the models at candidate boundaries with template information enables smooth transition between the models and templates.

Figure 6:
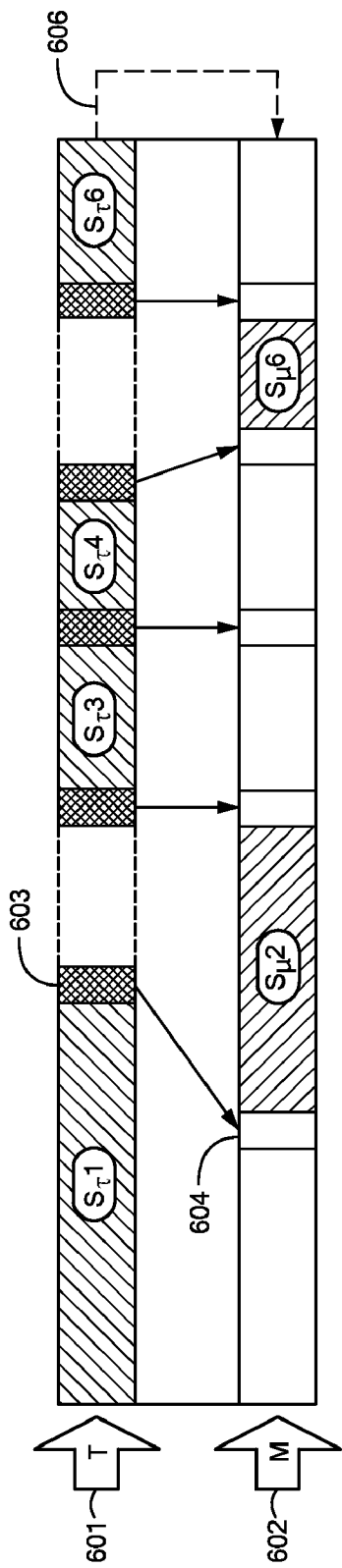
FIG. 6 illustrates the principle of template augmentation.

FIG. 6 shows template augmentation where T 601 represents the template sequence and M 602 denotes the model sequence. Some boundary template features 603 are imposed at the template segment boundaries 604. In comparison with the model track generation process described above, the variance of static features from the utterances are not only modeled by means of Gaussian distributions, but also applied as template vectors derived from the template partial paths in order to compute a gradient that maximizes the output probability.

To compute the optimal parameters of the model sequence, the following criterion may be maximized:

$$L = \log \{p(O|Q,\lambda)^{\bar{\omega}} \cdot p(v(C_\beta)|\lambda_{vg})^\eta \cdot p(v(C_\beta)\lambda_{vt})^{1-\eta}\} \quad (2)$$

where $p(O|Q,\lambda)$ is the output probability of the parameter vector O given a continuous mixture HMM λ with state-mixture vector sequence Q. The term $p(v(C_\beta)|\lambda_{vg})$ represents the output probability of the variance of the boundary updated static feature vector sequence $C_\beta$ given a global variance Gaussian model $\lambda_{vg}$. As mentioned previously, separate global variance Gaussian models are utilized for different phoneme classes, e.g. an unvoiced and voiced model. The separate models are dynamically switched during the process of the track generation based on the XPT string from which the phoneme class is derived. The term $p(v(C_\beta)|\lambda_{vt})$ represents the output probability of the variance of the boundary updated static feature sequence $C_\beta$, given a template variance Gaussian model $\lambda_{v,t}$. The Gaussian model of the global variance and template variance share the same covariance matrix Σ. In case of the Gaussian models for the template variance, the mean vectors are derived from the template segment paths $K_\tau$. The constants ω and η are weights to control the balance between the output probabilities. Here ω is a dimensionality scaling factor.

$$\varpi = \frac{1}{N_d \cdot T},$$

where $N_d$ is the dynamic dimension order (e.g. 3 for static's, delta's and double delta's). $\eta$ is the partial path ratio previously defined. All probability terms of the equation are computed independently from the state-duration probability $P(q|\lambda)$. The state-duration probabilities may be maximized using the durations of the template segments from the partial paths and the probability distribution functions of the state duration model.

To determine $C_b$ that maximizes L in Equation (2) above, an iterative method can be applied such as steepest descent, Newton-Raphson, or other methods. The static template local variance can be computed at run-time or fetched from the template segment database where the local variance vectors are efficiently stored. The template vectors for augmenting the boundary models can be represented by a full vector, a piece-wise linear approximation or by an index to a vector quantized (VQ) codebook.

The model-template sequencer generates the final sequence of models and templates using information from previous processing blocks in order to make a decision that can be synthesized as natural and smooth speech. This information can be, for example, partial template-paths lengths, partial path performance scores, template segment scores and probabilities, linguistic descriptors of segments, etc.

The information from previous processing blocks in combination with the earlier mentioned psycho-acoustic masking is used to determine the final model-template sequence for synthesis. This combines objective information weighting (e.g., scores of cost functions that express template candidate fits) with subjective information (e.g., how well template candidates are perceived). For example, templates that are not perceptually salient but potentially introduce a join distortion (oin-cost) can be replaced with more modifiable oriented model segments. The decision can be, for example, implemented by means of decision rules. The rules may be empirical and/or generated by means of pattern matching methods, clustering methods or statistical training using an analysis-by-synthesis technique (see closed loop hybrid synthesis). Some examples of empirical rules are:
  1. Use model-segments for all silences prior to phrase initial fricatives.
  2. If a syllable initial/final consonant has some partial out of model segments, then make it all model segments.
  3. If in a template segment of length greater than two frames the templates at the edges of model-template transitions or template-template transitions have a normalized path cost greater than 1e–3 (for example, which indicates a bad match), then replace the edge templates by models, etc.

An example of a statistically derived rule is a template segment transition probability which indicates how well this segment can be joined with another non-adjacent template segment.

In addition to determining the final sequencing, the model-template sequencer also determines whether and how to modify a specific speech segment in the final sequence. Target modification cues are either used to transform segments or sent as indications to the synthesizer. Examples of modification cues would be to alter the volume of a model segment to match an adjacent template segment or to impose a pitch rise on the final syllable in order to generate a question intonation.

Figure 7:
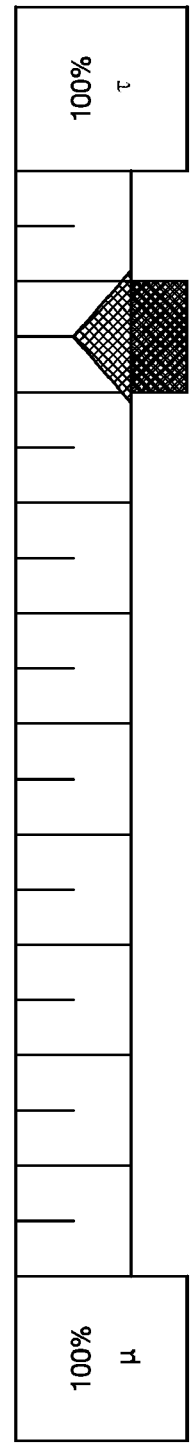
FIG. 7 illustrates a model-template control slider according to one embodiment.

The rules can be regarded as filters on the template database since they prevent some template sequences from occurring in the final template-model sequence without causing significant audible artefacts. In an alternative embodiment, these rules can be used to prune the template database offline. This can be highly flexible as the hybrid system can be tuned towards any given target application size. By using more models than templates, the size of system can be significantly reduced as model segments can be stored in a very compact form. FIG. 7 illustrates this in the form a control slider. When the control slider is shifted entirely towards the left side, the system behaves as a HMM-based TTS system. When the control slider is positioned entirely at the right-hand side, the system behaves as a pure segment concatenation based TTS. When the control slider is positioned anywhere in between, the system operates in hybrid mode and will select and generate both model segments and template segments that are joined together without audible artefacts. In optimal hybrid operation mode, the model segment sections are indistinguishable to the human ear from the template segments. Moreover, in optimal hybrid operation, the system generates speech that is indistinguishable from human speech. In a less optimal hybrid mode, say when there are very few template candidate segments available, the system will optimally merge template segments with model segments making it the best possible TTS system as it combines the benefits from both basic TTS methods.

It is difficult to automatically judge if a synthesized utterance sounds natural or not. However it is possible to estimate the audibility of acoustic concatenation artefacts by using acoustic distance measures. The track generation and sequencing processes are non-linear so small changes of the control parameters can lead to a completely different segment sequencing and track generation. In order to increase the synthesis quality for a given input text, some sequencing and track generation control parameters can be tuned to a target message or a set of target messages by applying a series of small incremental changes of adaptive magnitude. For example, audible discontinuities can be iteratively reduced by increasing the weights on the concatenation costs during the template track generation and using more model tracks at unvoiced locations that have successive short template segments with high path costs. The updating can be performed in small steps over successive synthesis trials until all (or most) acoustic discontinuities fall below the hearing threshold. Automatic methods can be applied to find the optimal convergence such as by steepest descent or Newton-Raphson. These methods learn how the incremental parameter changes influence gradual differences in order to determine the optimal settings. The adaptation of the parameters of the track generation and sequencing processes is done automatically.

Figure 8:
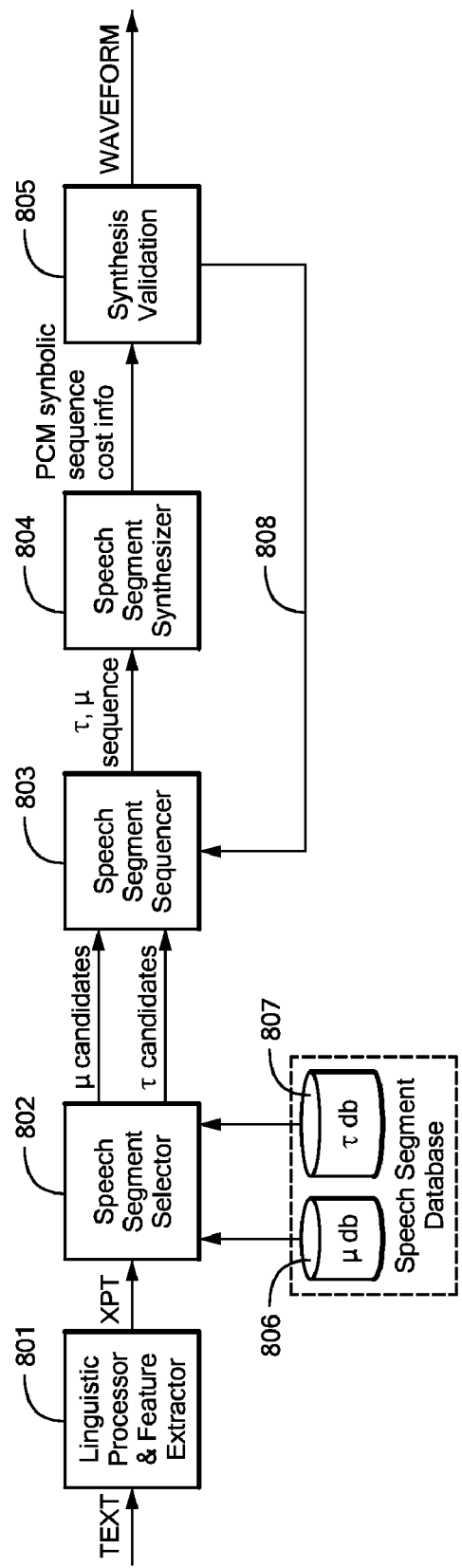
FIG. 8 illustrates an embodiment based on closed-loop hybrid synthesis.

Psycho-acoustic masking functions may be determined and tuned by iteratively updating or adding fuzzy tables and masking functions. Model segments suggested by linguistic motivated events that are not perceptually salient can be used to replace template segments. FIG. 8 shows such an embodiment which uses closed-loop synthesis, and this approach could be used for on-line synthesis, too.

In the system shown in FIG. 8, the one-pass segment sequencing and track generation is replaced by an adaptive speech segment sequencer 803 and placed in a closed loop 808. The speech segment selector 802 does not apply pruning so the model and template candidate lists are maximally populated. The overall process uses an iteration of synthesis attempts in which one or more parameters in the segment sequencing and track generation are adapted in small steps so that speech synthesis gradually improves in quality at each iteration. This is also referred to as analysis-by-synthesis. One drawback of this approach is that the overall speed of the speech synthesis system decreases. Another embodiment of the invention iteratively fine tunes the parameters used in speech segment sequencer 803 based on the average concatenation and sequencing costs. The average concatenation and sequencing costs can be the geometric average, the harmonic average, or any other type of average calculation.

Figure 9:
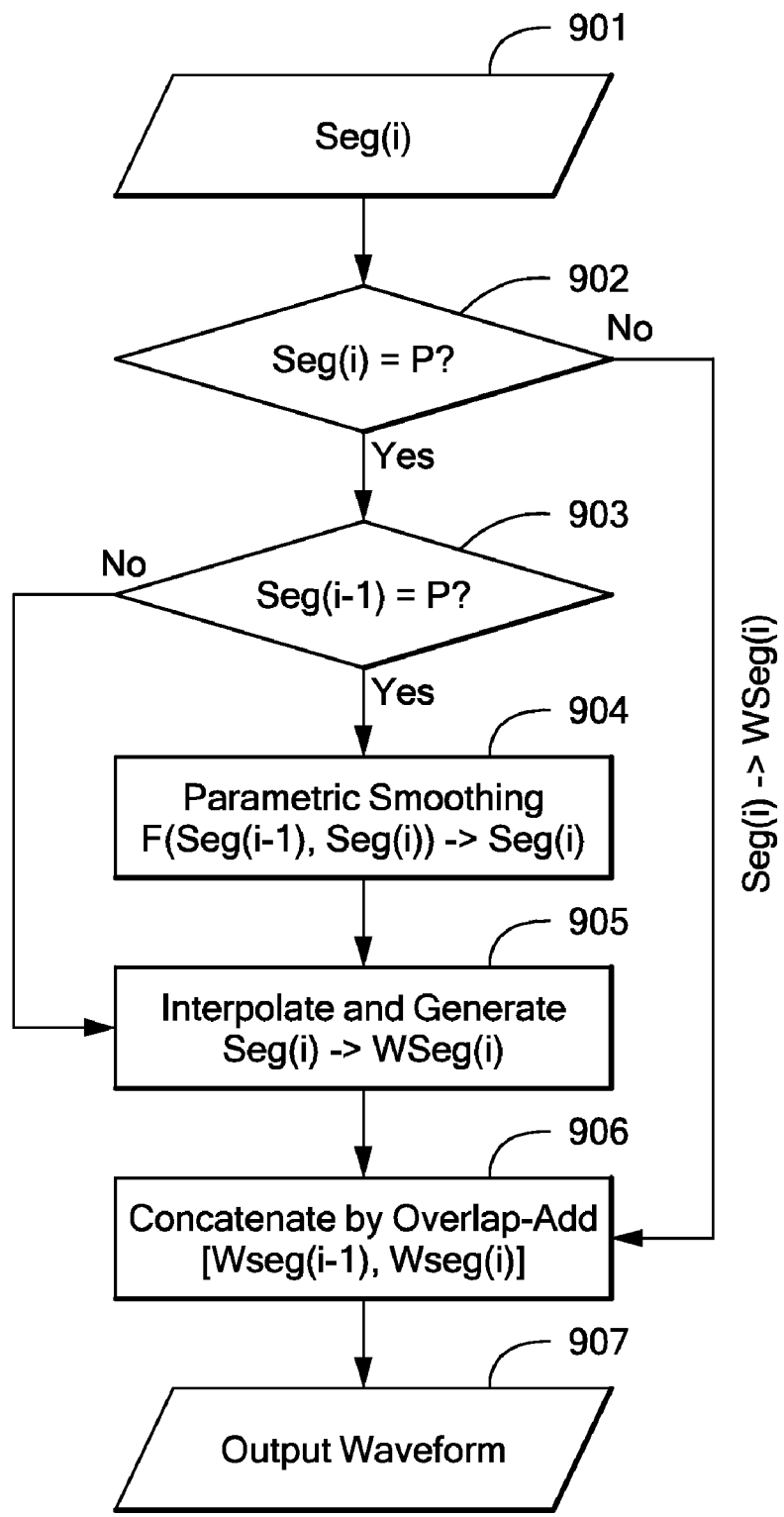
FIG. 9 illustrates the synthesizer scheme used in the embodiment of FIG. 7.

FIG. 9 shows a block diagram of a segment synthesizer. Selected and sequenced segments 901 can either be in parametric domain or in the time domain, although, due to their nature, model-based segments are always parametric. A template segment can either be in parametric form or in wave form. If a segment has a parametric form 902 and the previous segment 903 also is parametric form, then parametric smoothing 904 is performed over a zone between the current and previously selected parametric segment. If a segment is parametric form 902 and the previous segment 903 is not parametric form, then interpolation and generation 905 is performed followed by an overlap-add concatenation 906 technique. Interpolation is performed on the current parametric segment so that it matches the boundary of the previously waveform segment. One example of parametric interpolation is pitch period interpolation, but other acoustic features also can be implemented. In the generation phase 905, the segment is converted to a waveform segment. If a segment is a waveform 902 and the previous segment 903 is also a waveform, the segments are joined by an overlap-add concatenation 906 and form an output waveform buffer 907 than can be transmitted to an audio device.

Figure 10:
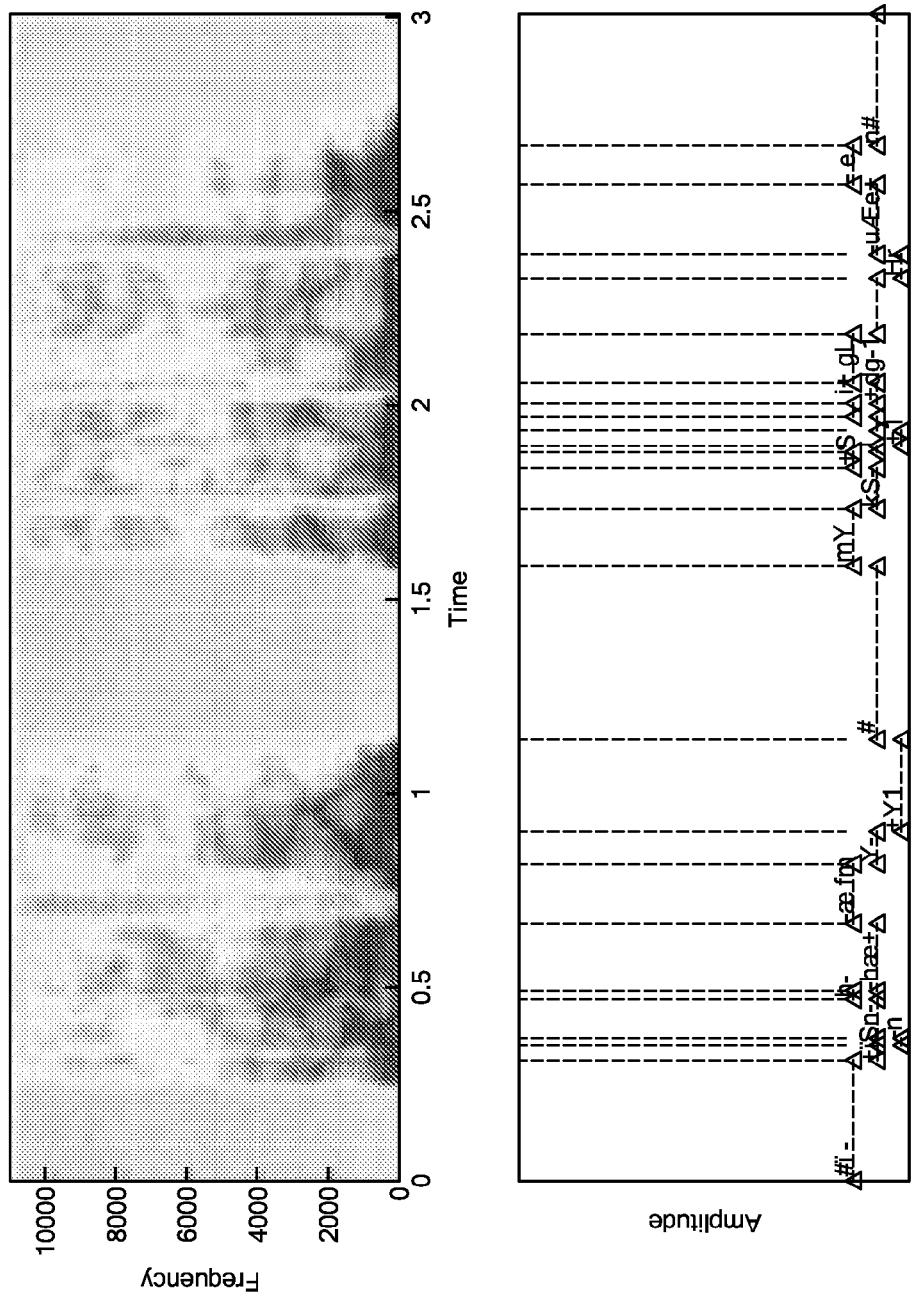
FIG. 10 shows graphic results of hybrid segment sequencing according to an embodiment.

An example of hybrid output synthesis is depicted in FIG. 10. The bottom pane displays the output speech signal and the top pane displays the spectrogram of the output speech signal. In the example shown, the speech synthesis output signal is obtained by entering the text transcription: "In a halfmile, make a legal U-turn." into the hybrid TTS system. The phonetic transcription generated by the linguistic processor of the input text is: #i̇ n $ "hæ f"mYl#"mJk $ "li.gL "ju. Æ en#. From the model-template sequencing, the following segments are found to be generated from models: #ï–,–æfm, #, –gL, –u. Æ e+. These correspond with the bold-face characters from the phonetic transcription. The '–' symbol denotes that the join is somewhere in left phoneme, e.g. diphone unit or smaller. The '+' symbols denotes that the join is somewhere in the right phoneme. The remaining segments that build up the speech utterance are template segments. The dashed vertical lines in the bottom pane represent the different speech segment boundaries. Fine dashed vertical lines are used for the model segments. Coarse dashed vertical lines are used for a template segments. A horizontal line between two vertical dashed lines represents a segment. At the beginning of the horizontal line, the phonetic symbols corresponding with the segment are printed. A dashed horizontal line denotes a model segment and a solid horizontal line denotes a template segment. By following the model segments to the upper pane of the spectrogram, one can see that the format structure of the template segments nicely joins with the model segments. In model segments (e.g. –æfm, –gL) at higher frequency, say above 4 kHz, the format structure becomes somewhat blurred compared with the format structure of template segments. This is due to the fact that models are approximations of natural speech. However, it has been observed through experimentation using the hybrid system that for heterosyllabic and tautosyllabic initial/final consonants and tautosyllabic short vowel-consonant transitions, in context of natural speech segments (or templates) the human ear is insensitive to (short) local approximations. The model segments are therefore indistinguishable in the total speech utterance by the human ear when properly joined.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A speech synthesis system implemented using at least one hardware implemented processor, the system comprising:
   a speech segment database referencing speech segments having a plurality of different types of speech representational structures including:
   i. statistical state model based speech signals, and
   ii. template based speech signals;
   a speech segment selector for selecting from the speech segment database a sequence of statistical state model based and template based speech segment candidates corresponding to a target text;
   a speech segment sequencer for generating from the speech segment candidates sequenced statistical state model based and template based speech segments corresponding to the target text; and
   a speech segment synthesizer for combining the sequenced statistical state model based and template based speech segments to produce a synthesized speech signal output corresponding to the target text.

2. A speech synthesis system according to claim 1, wherein the different types of speech representational structures include statistical state model-based speech signals augmented with template information.

3. A speech synthesis system according to claim 1, wherein the speech segment selector uses a statistical state model for selecting the speech segment candidates.

4. A speech synthesis system according to claim 3, wherein the speech segment selector uses template information to augment the statistical state model.

5. A speech synthesis system according to claim 1, wherein the different types of speech representational structures share at least one parameter component.

6. A speech synthesis system according to claim 5, wherein the shared parameter component is encoded differently in different speech representational structures.

7. A speech synthesis system according to claim 1, wherein the speech segment sequencer uses static observations in generating the sequenced speech segments.

8. A speech synthesis system according to claim 1, wherein the speech segment sequencer uses observations from the speech segment selector in generating the sequenced speech segments.

9. A speech synthesis system according to claim 1, wherein the speech segment sequencer uses static observations and observations from the speech segment selector in generating the sequenced speech segments.

10. A speech synthesis system according to claim 1, wherein the speech segment selector uses statistically derived cost-functions for selecting the speech segment candidates.

11. A speech synthesis system according to claim 1, wherein the speech segment sequencer uses statistically derived cost-functions for generating the sequenced speech segments.

12. A speech synthesis system according to claim 1, wherein the speech segment selector uses empirical rules for selecting the speech segment candidates.

13. A speech synthesis system according to claim 1, wherein the speech segment sequencer uses empirical rules for generating the sequenced speech segments.

14. A speech synthesis system according to claim 1, wherein the speech segment selector uses psycho-acoustic rules for selecting the speech segment candidates.

15. A speech synthesis system according to claim 1, wherein the speech segment sequencer uses psycho-acoustic rules for generating the sequenced speech segments.

16. A speech synthesis system according to claim 10, wherein the statistically derived cost-functions are based on sequences of speech segment observations.

17. A speech synthesis system according to claim 16, wherein the sequences of speech segment observations are described by a Markov process.

18. A speech synthesis system according to claim 11, wherein the statistically derived cost-functions are based on sequences of speech segment observations.

19. A speech synthesis system according to claim 18, wherein the sequences of speech segment observations are described by a Markov process.

20. A method of speech synthesis comprising:
with a system implemented using at least one hardware implemented processor:
referencing in a speech segment database speech segments having a plurality of different types of speech representational structures including:
  i. statistical state model based speech signals, and
  ii. template based speech signals;
selecting from the speech segment database a sequence of statistical state model based and template based speech segment candidates corresponding to a target text;
generating from the speech segment candidates sequenced statistical state model based and template based speech segments corresponding to the target text; and
combining the sequenced statistical state model based and template based speech segments to produce a synthesized speech signal output corresponding to the target text.

21. A method according to claim 20, wherein the different types of speech representational structures include statistical state model-based speech signals augmented with template information.

22. A method according to claim 20, wherein a statistical state speech model is used in selecting the sequence of speech segment candidates.

23. A method according to claim 22, wherein the statistical state speech model is augmented by template information.

24. A method according to claim 20, wherein the different types of speech representational structures share at least one parameter component.

25. A method according to claim 24, wherein the shared parameter component is encoded differently in different speech representational structures.

26. A method according to claim 20, wherein static observations are used in generating the sequenced speech segments.

27. A method according to claim 20, wherein observations from the selecting the sequence of speech segment candidates are used in the generating the sequenced speech segments.

28. A method according to claim 20, wherein static observations and observations from the selecting the sequence of speech segment candidates are used in the generating the sequenced speech segments.

29. A method according to claim 20, wherein statistically derived cost-functions are used for selecting the speech segment candidates.

30. A method according to claim 20, wherein statistically derived cost-functions are used for generating the sequenced speech segments.

31. A method according to claim 20, wherein empirical rules are used for selecting the speech segment candidates.

32. A method according to claim 20, wherein empirical rules are used for generating the sequenced speech segments.

33. A method according to claim 20, wherein psycho-acoustic rules are used for selecting the speech segment candidates.

34. A method according to claim 20, wherein psycho-acoustic rules are used for generating the sequenced speech segments.

35. A method according to claim 29, wherein the statistically derived cost-functions are based on sequences of speech segment observations.

36. A method according to claim 35, wherein the sequences of speech segment observations are described by a Markov process.

37. A method according to claim 30, wherein the statistically derived cost-functions are based on sequences of speech segment observations.

38. A method according to claim 37, wherein the sequences of speech segment observations are described by a Markov process.

* * * * *